Sept. 29, 1942. H. P. PHILLIPS 2,297,112

PISTON RING

Filed Aug. 5, 1939

INVENTOR.
Harold P. Phillips
BY Earl & Chappell
ATTORNEYS

Patented Sept. 29, 1942

2,297,112

UNITED STATES PATENT OFFICE 2,297,112

PISTON RING

Harold P. Phillips, Hastings, Mich., assignor to Hastings Manufacturing Company, Hastings, Mich., a corporation of Michigan Application August 5, 1939, Serial No. 288,553

1 Claim. (Cl. 309—45)

This invention relates to improvements in piston rings.

The main objects of my invention are:

First, to provide a novel piston ring having provisions for metering oil past the same so as to eliminate a possible tendency to excessive dryness in certain installations of the ring.

Second, to provide a piston ring of the oil type and particularly a composite piston ring having a plurality of wall engaging elements provided with means for metering a predetermined amount of oil past the ring or one of the elements thereof to insure the desired lubrication of the cylinder wall.

Third, to provide a piston ring member having a notched portion or recesses in the wall engaging surface thereof adapted to meter oil therethrough in operation of the ring.

Fourth, to provide a piston ring having metering provisions of the type described and including a novel arrangement or proportioning of the gap in the ring to supplement the aforesaid metering provisions.

Further objects relating to details and economies of my invention will definitely appear from the description to follow. The invention is defined in the claim.

A structure embodying the features of my invention is illustrated in the accompanying drawing, wherein.

Figure 1:
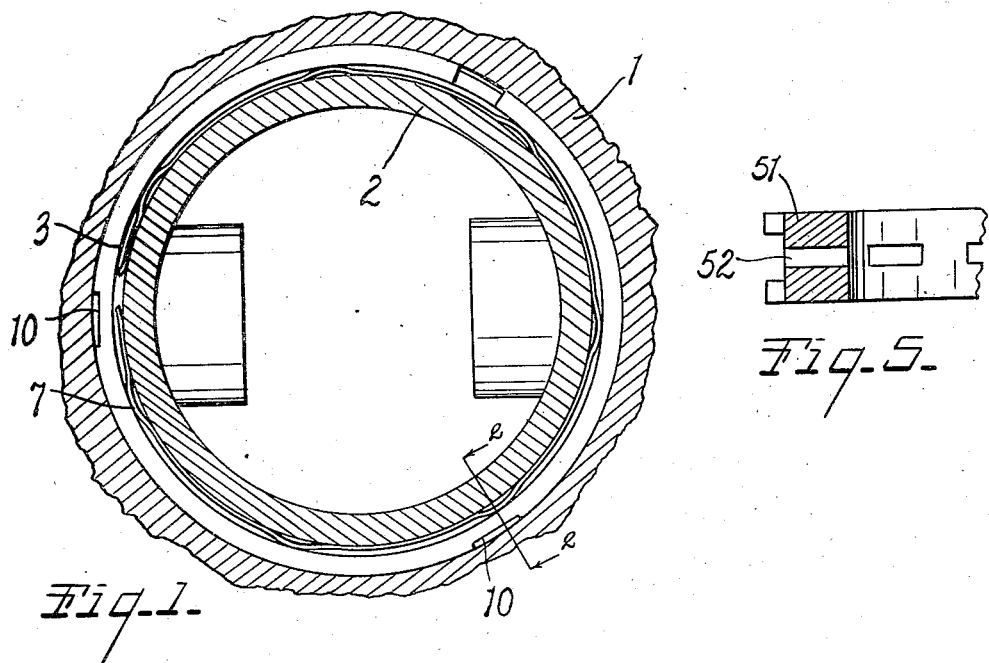
Fig. 1 is a fragmentary plan view in section on line 1—1 of Fig. 2, illustrating a piston and cylinder and a ring or ring assembly in accordance with my invention operatively positioned on the former.

In recent years various improvements have been made in piston rings dealing in general with the problem of reducing the thickness of the oil film on the cylinder wall of an internal combustion engine. My Patent No. 2,148,997 of February 28, 1939, illustrates a composite piston ring assembly including a plurality of steel cylinder wall engaging elements which was particularly designed and is very effective in operation to increase the oil control ability of the assembly, i. e., its ability to decrease oil consumption without increasing the unit pressure exerted on the cylinder wall. A further development stemming from the concept of the aforesaid patent is illustrated and described in my copending application Serial No. 237,687, filed October 29, 1938, which has been found to increase the oil control ability of the assembly by at least two thirds. The aforesaid activity in the art indicates clearly that a condition may well be reached in which, while the ring very effectively controls blow-by and has very good oil control, the ring may become too dry, there being insufficient oil reaching certain of the elements in an installation having a plurality of cylinder wall engaging elements, particularly during the break-in period, with resultant scuffing and seizure.

It is therefore a primary purpose of my invention to provide a ring having provision for metering or passing a certain predetermined amount of oil during the early stages of the piston ring's life to reach various wall engaging elements beyond the first oil ring, thus giving the desired amount of lubrication at the beginning of the ring operation. My invention likewise comprehends provisions of the type described which are of such nature that the rings may wear to a full cylinder wall engaging peripheral contact after the break-in period and throughout the later life of the ring.

Referring to the drawing, the reference numeral 1 indicates a cylinder in which a piston 2 reciprocates, the latter having grooves 3 for receiving the various piston rings.

In the preferred embodiment of my invention these last named rings are in the form of composite assemblies generally constructed in accordance with the teachings of my Patent 2,148,997 referred to above. These assemblies consist of the upper and lower cylinder wall engaging elements or segments 4 of thin ribbon-like steel disposed in edge engagement with the cylinder wall and spaced by cast iron spacers 5 which are radially notched or ventilated at 6. The wall engaging elements are urged radially by an inner steel expanding spring 7 of conventional type.

Figure 3:
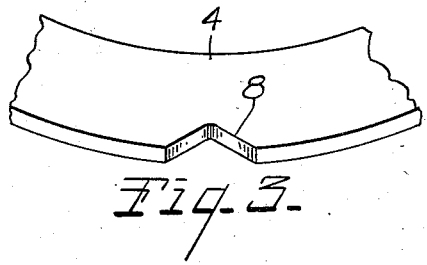
Figs. 3 and 4 are enlarged fragmentary perspective views illustrating modified embodiments of a piston ring scraping element having oil metering provisions in accordance with my inventon.
Figure 4:
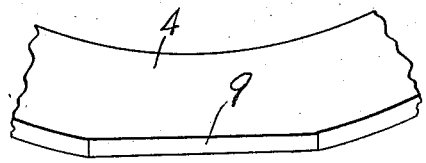

In accordance with my invention, for assuring a predetermined flow of oil past certain of the cylinder wall engaging elements or segments 4 whereby a suitable supply of lubricant to the cylinder wall is assured, I provide these elements or segments 4 with notches 8 suitably machined or ground in the outer periphery thereof as illustrated in Figs. 1 and 3, or with flats or chord-like lands 9 as illustrated in the modified embodiment of Fig. 4. As illustrated in Fig. 1, such openings or recesses produced in the manner described are spaced at predetermined intervals around the periphery of the elements 4, Fig. 1 illustrating a preferred form of notch 10 having radial sides which may be employed. In the embodiment of Fig. 3 the notches are triangular with the side walls diverging outwardly.

A further feature of my invention directed to the foregoing end of metering oil past the sealing elements of the piston ring lies in the material increasing of the gap opening of the ring when it is in installed position as illustrated in Fig. 1. This opening is of substantially greater width than that ever used in any other type of ring; that is whereas in usual piston ring construction the gap is merely a nominal one of perhaps .010 to .020 inch in accordance with my invention I contemplate that the gap shall be anywhere from $\frac{1}{16}$ inch, for a ring of 3 inch diameter, to $\frac{5}{16}$ inch, a range of dimensions which are obviously much higher than the maximum merely nominal gap clearance hitherto employed. Such a gap, particularly when utilized in conjunction with a ring having an intermediate spacer 5, as illustrated, constitutes the full equivalent of one of the other metering notches, recesses or flats 8 or 9, duplicating the action thereof and obviously eliminating the need for unduly weakening the element 4 by excessively machining its outer periphery.

As for the machined notches, recesses or flats 8 and 9, they may be replaced by notches of various different sizes or shapes, i. e., they may be of such shape as to increase the opening through the ring or ring element upon wear of the latter, for example, the reverse of the notch 8 and in which the triangular recess has its side walls converging outwardly to a small opening or passage on the periphery. Obviously, the triangular notch 8 arranged as shown in Fig. 3 decreases the size of the opening as the ring wears and reduces the oil allowed to pass. The flat 9, as illustrated in Fig. 4, would tend to rapidly reduce the size of the opening and would eventually be worn entirely away. On the other hand the rectangular notch illustrated in Fig. 1 retains a relatively uniform opening and keeps substantially constant the amount of oil it permits to pass the ring.

Manifestly, a selection of the size and type of recess or opening at the outer periphery of the sealing element 4 is a matter capable of considerable choice depending entirely upon the type of ring or ring assembly, the amount of ring tension and other factors, all of which govern the character and amount of oil metering which is desired. It may even be desirable to accomplish the oil metering chiefly or entirely by the aforesaid feature of spacing the ends of the elements relatively far apart, increasing the amount of oil metered if desired by comparatively small flats or other recesses machined in the cylinder wall contacting surface.

Figure 2:
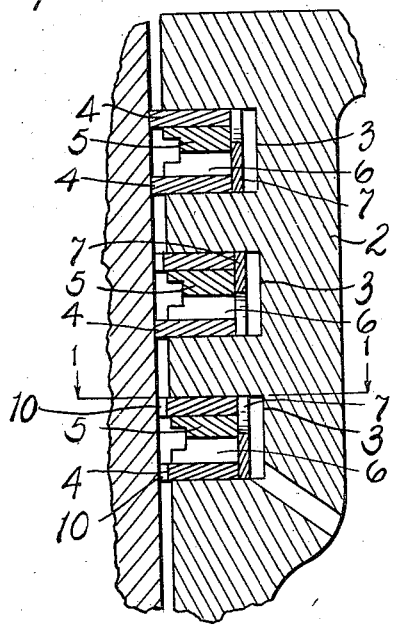
Fig. 2 is an enlarged fragmentary view in section on a line corresponding to line 2—2 of Fig. 1, illustrating details of my invention in a preferred embodiment utilizing a composite piston ring assembly.

Furthermore, although it finds its preferred application in a composite assembly of the type illustrated in Fig. 2, my invention is obviously applicable to piston rings of any type which have a tendency to run dry, whether the ring is a unitary one or part of a composite assembly. For instance, in certain Diesel engines using five or six compression rings on a piston, it might be found that under certain circumstances an oil ring is not needed but that the oil metering feature of my invention could be utilized by metering notches or recesses as described in the faces of one or more of the lower compression rings. Such a circumstance might also arise in the case of a compression ring far enough down on the piston to be below the oil ring of a conventional internal combustion engine.

Figure 5:
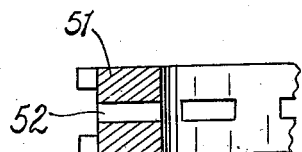
Fig. 5 is a fragmentary view in vertical section illustrating a modified embodiment of spacer element for use in conjunction with a piston ring assembly of the type illustrated in Fig. 2.

In Fig. 5 I illustrate a modified embodiment of spacer 51 corresponding to that designated 5 in Fig. 2 and having the ventilating slots or recesses 52 disposed intermediate the top and bottom thereof. This type of spacer will serve to retain a certain amount of oil in the annular space between the integral ledges 53 thereon.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention what I claim as new and desire to secure by Letters Patent is:

A split piston ring element adapted to be disposed in a piston ring groove for engagement with a cylinder wall, said element having a recess of substantial circumferential width having radial sides formed in the peripheral cylinder wall engaging surface thereof to permit metering of a predetermined quantity of oil therethrough in operation and the ends of said element being spaced approximately $\frac{1}{16}$ to $\frac{5}{16}$ inch when operatively compressed and inserted in a cylinder to supplement the metering action of said recess.

HAROLD P. PHILLIPS.